US008317619B2

(12) United States Patent
Okada

(10) Patent No.: US 8,317,619 B2
(45) Date of Patent: Nov. 27, 2012

(54) GAMING SYSTEM, SERVER, GAMING TERMINAL AND GAME CONTROL METHOD

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 955 days.

(21) Appl. No.: 11/723,254

(22) Filed: Mar. 19, 2007

(65) Prior Publication Data

US 2008/0076558 A1 Mar. 27, 2008

Related U.S. Application Data

(60) Provisional application No. 60/846,362, filed on Sep. 22, 2006.

(51) Int. Cl.
*A63F 13/12* (2006.01)
*G06F 9/445* (2006.01)

(52) U.S. Cl. ............................. 463/42; 463/29; 717/176

(58) Field of Classification Search .................... 463/36, 463/42, 43, 29; 719/217–219, 231; 713/168–170, 713/155; 726/2–4, 17; 717/174–178
See application file for complete search history.

(56) References Cited

U.S. PATENT DOCUMENTS 5,643,086 A * 7/1997 Alcorn et al. .................. 463/29
6,645,077 B2 11/2003 Rowe
2002/0137217 A1* 9/2002 Rowe .............................. 436/42
2004/0259633 A1 12/2004 Gentles et al.
2005/0054448 A1 3/2005 Frerking et al.
2006/0035713 A1 2/2006 Cockerille et al.

OTHER PUBLICATIONS

Austrailian Government Patent and Trademark Office, Office Action of AU Patent Application No. 2007216623, Jan. 4, 2012, Woden, Australia.

* cited by examiner

*Primary Examiner* — Peter DungBa Vo
*Assistant Examiner* — Damon Pierce
(74) *Attorney, Agent, or Firm* — Lexyoume IP Meister, PLLC.

(57) ABSTRACT

A game control method according to the present invention comprises: a downloading step conducted by a server of downloading game software components to be used in a gaming terminal, along with authentication programs for authenticating the game software components to the gaming terminal; an authenticating step conducted by the gaming terminal of executing the authentication programs to authenticate the game software components downloaded from the server, prior to start of a game; and a producing step conducted by the gaming terminal of producing games to be executed in the gaming terminal using the game software components authenticated through the authentication programs.

19 Claims, 8 Drawing Sheets

GAMING SYSTEM, SERVER, GAMING TERMINAL AND GAME CONTROL METHOD

CROSS-REFERENCE TO RELATED APPLICATIONS

This application claims priority of U.S. Provisional Application No. 60/846,362 filed on Sep. 22, 2006. The contents of this application are incorporated herein by reference in their entirety.

BACKGROUND OF THE INVENTION

1. Field of the Invention

The present invention relates to a gaming system, a server, a gaming terminal and a game control method.

2. Discussion of the Background

The specification of U.S. Pat. No. 6,645,077, and the specifications of US 2005/0054448-A1 and US 2006/0035713-A1 disclose gaming systems capable of executing a plurality of types of games in a single gaming terminal or changing the contents of games which can be played in gaming terminals in a network, utilizing techniques for downloading game programs through a network.

In the aforementioned gaming systems, game software components are downloaded to the respective gaming terminals from a server, and the respective gaming terminals execute games using the downloaded game software components.

It is an object of the present invention to prevent game software components from being falsified during or after downloading of these game software components from a server to each gaming terminal and to prevent the occurrence of errors in game software components during games which stagnates playing of games.

The contents of U.S. Pat. No. 6,645,077, US 2005/0054448-A1, and US 2006/0035713-A1 are incorporated herein by reference in their entirety.

SUMMARY OF THE INVENTION

According to the present invention, there is provided a gaming system as follows.

(1) A gaming system according to the present invention includes a server, a plurality of gaming terminals and a network.

The aforementioned server includes (A) a first network interface, (B) a first memory and (C) a processor. The aforementioned first network is for communicating with a plurality of gaming terminals. The aforementioned first memory stores (a) game software components to be used in a plurality of gaming terminals and (b) authentication programs for authenticating the aforementioned game software components. The aforementioned processor is designed or configured to download the aforementioned game software components to the aforementioned gaming terminals along with the aforementioned authentication programs.

The aforementioned gaming terminals each comprising (I) a second network interface, (II) a controller and (III) a second memory. The aforementioned second network interface is for communicating with the aforementioned server. The aforementioned controller (i) executes the aforementioned authentication programs to authenticate the game software components downloaded from the server prior to start of games. The aforementioned controller (ii) produces games to be executed in the aforementioned gaming terminals using the aforementioned game software components authenticated through the aforementioned authentication programs. The aforementioned second memory stores the aforementioned game software components and the aforementioned authentication programs downloaded from the aforementioned server. The aforementioned network enables communication between the server and the plurality of gaming terminals.

There is no particular limitation on the hardware structure of the aforementioned server, provided that it can function as the server according to the present invention, and a conventional server can be employed. Further, the aforementioned server can include a firewall and a modem. The aforementioned server can be constituted by either a single device or a plurality of devices. Any one of the aforementioned gaming terminals which includes a firewall and a modem can be configured to function as the aforementioned server.

There is no particular limitation on the aforementioned gaming terminals, and it is possible to employ, for example, gaming machines such as slot machines, personal computers, personal digital assistants, and the like. Further, there is no particular limitation on games which are executed in the aforementioned gaming terminals, and such games may be, for example, video bingo games, video lottery games, video blackjack games, video slot games, mechanical slot games, video poker games, video Kino games, video pachinko games, video card games, Video-game-of-chances, and the like.

There is no particular limitation on the aforementioned first network interface, and the aforementioned first network interface can be either a wireless network interface or a wired network interface, provided that it can communicate with a plurality of gaming terminals. This applies to the aforementioned second network interface, and there is no particular limitation on the aforementioned second network interface, provided that it can communicate with the aforementioned server. Further, the communication between the aforementioned server and the aforementioned plurality of gaming terminals can be realized through the internet or an intranet. There is no particular limitation on the aforementioned intranet, and the aforementioned intranet can be, for example, a cashless system network, a progressive game network, an accounting network, a bonus game network and the like. There is no particular limitation on the aforementioned first memory, and the aforementioned first memory can be, for example, a nonvolatile memory, a hard disk drive, a CD-RW drive, a DVD-RAM drive and the like. This applies to the aforementioned second memory.

The aforementioned game software components are data, programs, modules and the like which are used in executing games in the gaming terminals. The aforementioned game software components may be, for example, game system components, payout tables, game bonusing programs, game progressive programs, graphic data, sound data, game jurisdiction information, game network components, and the like. The aforementioned controller can execute games using combinations of these game software components.

Further, there is no particular limitation on the triggers which cause the aforementioned processor to download the aforementioned game software components to the aforementioned gaming terminals along with the aforementioned authentication programs. For example, such triggers may be a predetermined time, day and week of updating, predetermined updating events and the like. Also, such triggers may be inputs by the player, results of games, game histories and the like.

Further, the aforementioned controller can produce games using only game software components downloaded from the server and authenticated through the authentication programs. Also, the aforementioned controller can produce games using a combination of game software components downloaded from the server and authenticated through the authentication programs and game software components prestored in the second memory.

Further, the aforementioned controller can be designed or configured to execute applications for collecting information about each gaming terminal in the aforementioned server. The aforementioned applications may be, for example, a data analysis application, a configuration designing application, a scheduling designing application, a report creation application, a query configuration application, a game software version management application, and the like.

In the aforementioned gaming system, each gaming terminal can create game process data which will be described later and then can transmit it to the aforementioned server, and the server can store it in the aforementioned first memory. The game process data may be, for example, game version data, game data, gaming terminal data, player data, route data, venue data, and the like. The game process data can be stored in the aforementioned first memory as a database, in such a way that the game process data is separated from the aforementioned game software components.

In cases where the aforementioned gaming system includes gaming terminals provided by different entities, game software components and/or game process data can be stored in the aforementioned second memory, in such a way that they are divided for the respective entities. Also, it is possible to restrict the access to the game software components and/or the game process data relating to gaming terminals provided by different entities, in such a way that each entity can not access to the game software components and/or game process data relating to the other entities. Also, it is possible to define hierarchical access authorities of the respective devices which constitute the aforementioned gaming system for the aforementioned game software components and/or game process data, so that the access thereto can be restricted according to the hierarchical access authorities.

The aforementioned processor can be configured to conduct the following processes 1) to 4) for downloading the aforementioned game software components.

1) Processing for establishing communication with gaming terminals,

2) Processing for selecting game software components to be updated,

3) Processing for bundling the selected game software components, and

4) Processing for downloading the bundled game software components to the aforementioned gaming terminals, along with authentication programs.

Further, the aforementioned processor can conduct the following processes 1) to 11) for downloading the aforementioned game software components.

1) Processing for making contact with a local ISP (an internet service provider) prior to the start of transmission of the aforementioned game software components and transmitting the aforementioned game software components through the aforementioned local ISP, 2) Processing for checking the IP addresses of gaming terminals, 3) Processing for dividing the aforementioned game software components into a plurality of packets, 4) Processing for coding the aforementioned game software components, 5) Processing for creating instructions relating to the setting of the aforementioned game software components and transmitting the aforementioned instructions along with the aforementioned game software components, 6) Processing for making a request of the aforementioned gaming terminals for version information about the aforementioned game software components, 7) Processing for receiving the version information about the aforementioned game software components from the aforementioned gaming terminals, 8) Processing for receiving game process information from the aforementioned gaming terminals and storing the aforementioned game process information, according to game data categories (for example, game version data, game data, gaming terminal data, player data, route data, venue data and the like), 9) Processing for determining the access authority for the aforementioned game process information, prior to storing the game process information, 10) Processing for selecting data storage partitions from a plurality of data storage partitions corresponding to respective entities, and 11) Processing for checking updating triggers (for example, a time, day and week of updating, updating events, predetermined inputs by the player, results of games, game histories).

The aforementioned controller can conduct the following processes 1) to 5) for structuring game software.

1) Processing for establishing communication with the aforementioned server,

2) Processing for receiving gaming software components from the aforementioned server, 3) Processing for unbundling the aforementioned game software components, 4) Processing for creating a combination of game software components including the aforementioned game software components received from the aforementioned server, and 5) Processing for executing games using the aforementioned combination of game software components Further, the aforementioned gaming system can employ any of the following configurations a) to c).

a) The aforementioned server executes games, and the aforementioned gaming terminals display the results of the games.

b) The aforementioned gaming terminals execute games, the aforementioned server determines the result of games, and the aforementioned gaming terminals display the result of games.

c) The aforementioned gaming terminals execute games and display the result of games, and the aforementioned server downloads the aforementioned game software components to the aforementioned gaming terminals.

In the present invention, with any of the aforementioned configurations a) to c), it is possible to download game software components to be used in the aforementioned gaming terminals from the aforementioned server to the aforementioned gaming terminals. Further, it is possible to download authentication programs when downloading the aforementioned game software components.

Further, according to the present invention, there is provided the following system.

(2) The gaming system according to the aforementioned (1), wherein the aforementioned controller is designed or configured to automatically erase the aforementioned game software components, in the event of occurrence of an error as a result of the authentication of the aforementioned game software components through the aforementioned authentication programs.

Further, according to the present invention, there is provided the following system.

(3) The gaming system according to the aforementioned (1) or (2), wherein the aforementioned controller is designed or configured to transmit, to the aforementioned server, a request signal for requesting downloading of the aforementioned game software components to this gaming terminal, in the event of occurrence of an error as a result of the authentication of the aforementioned game software components through the aforementioned authentication programs.

Further, according to the present invention, there is provided the following system.

(4) The gaming system according to the aforementioned (3), wherein the aforementioned processor is designed or configured to download the aforementioned game software components to this gaming terminal, on receiving the aforementioned request signal from the aforementioned controller.

Further, according to the present invention, there is provided the following system.

(5) The gaming system according to any one of the aforementioned (1) to (4), wherein the aforementioned controller is designed or configured to execute the aforementioned authentication programs at predetermined regular time intervals, in addition to the time prior to start of games, to authenticate the aforementioned game software components downloaded from the aforementioned server.

Further, according to the present invention, there is provided the following system.

(6) The gaming system according to any one of the aforementioned (1) to (5), wherein the aforementioned controller is designed or configured to transmit, to the aforementioned server, the result of authentication of the game software components through the aforementioned authentication programs, along with an ID code assigned to this gaming terminal.

Further, according to the present invention, there is provided the following system.

(7) The gaming system according to the aforementioned (6), further including a remote terminal capable of communicating with the aforementioned server, the aforementioned processor designed or configured to transmit error notification signals to the aforementioned remote terminal, if the aforementioned processor does not receive the result of authentication from the aforementioned gaming terminals within a predetermined time period, and the aforementioned error notification signals include the ID codes assigned to the corresponding gaming terminals.

BRIEF DESCRIPTIONS OF THE DRAWINGS

DESCRIPTION OF THE EMBODIMENTS

Figure 1:
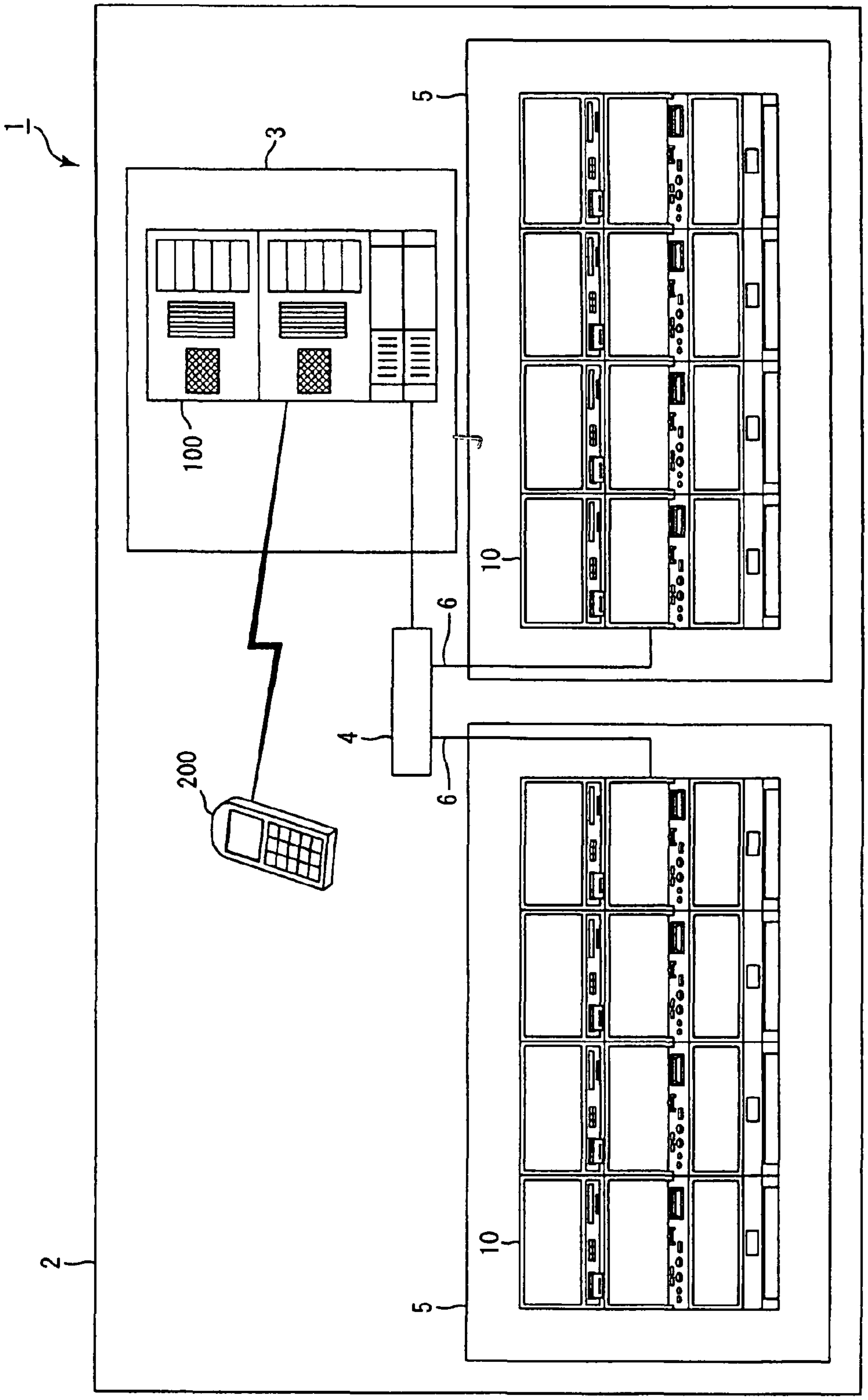
FIG. 1 is a network schematic diagram of a gaming system according to an embodiment of the present invention.

FIG. 1 is a network schematic diagram of a gaming system according to an embodiment of the present invention.

The gaming system 1 includes a server 100 and a plurality of slot machines (gaming terminals) 10 which are installed in a casino 2. The server 100 is installed in a computer room 3 in the casino 2. Further, the plurality of slot machines 10 are installed in a casino floor 5. The server 100 and the plurality of slot machines 10 are connected to each other through a router 4 and a LAN 6. A portable terminal (remote terminal) 200 is carried by a clerk in the casino 2 and is capable of wireless communication with the server 100. Accordingly, even when the clerk enters the computer room 3 or the casino floor 5, he or she can communicate with the server 100 using the portable terminal 200.

The server 100 includes management tools and downloading tools required for managing information about a certain slot machine 10 or a certain group of slot machines 10 and for managing data access of respective users. An operator of the server 100 who has valid access authority can set various types of parameters, as triggers for downloading programs and information such as game software components to the slot machines 10. Further, the server 100 can be either connected to a legacy system such as a cashless system and the like in the casino 2 or directly connected to the slot machines 10. Also, it is possible to utilize both of these structures to easily perform downloading of information and collection of data.

The slot machines 10 correspond to the gaming terminals according to the present invention. However, in the present invention, the gaming terminals are not limited to the case, but may be video slot machines, mechanical slot machines, gaming terminals capable of executing bingo games, Kino games, lottery games and the like.

The slot machines 10 are installed in the casino floor 5. However, in the present invention, there is no particular limitation on the venue in which the gaming terminals are installed, and the venue may be, for example, a casino, a store, a restaurant, a bar, a ship and the like. Also, the venue can be owned and/or managed by a plurality of entities. Also, the gaming system according to the present invention can be structured to include a plurality of different types of venues.

Each slot machine 10 transmits, to the server 100, game process information (for example, the number of inserted coins, the number of coins to be paid out), game-software-component information (for example, version information about software) and player tracking information (for example, the ID code of a player). Further, each slot machine 10 is capable of transmitting and receiving information to and from the server 100 and communicates with the server 100 through the router 4. The slot machines 10 can communicate with the server 100 through a legacy system.

Figure 2:
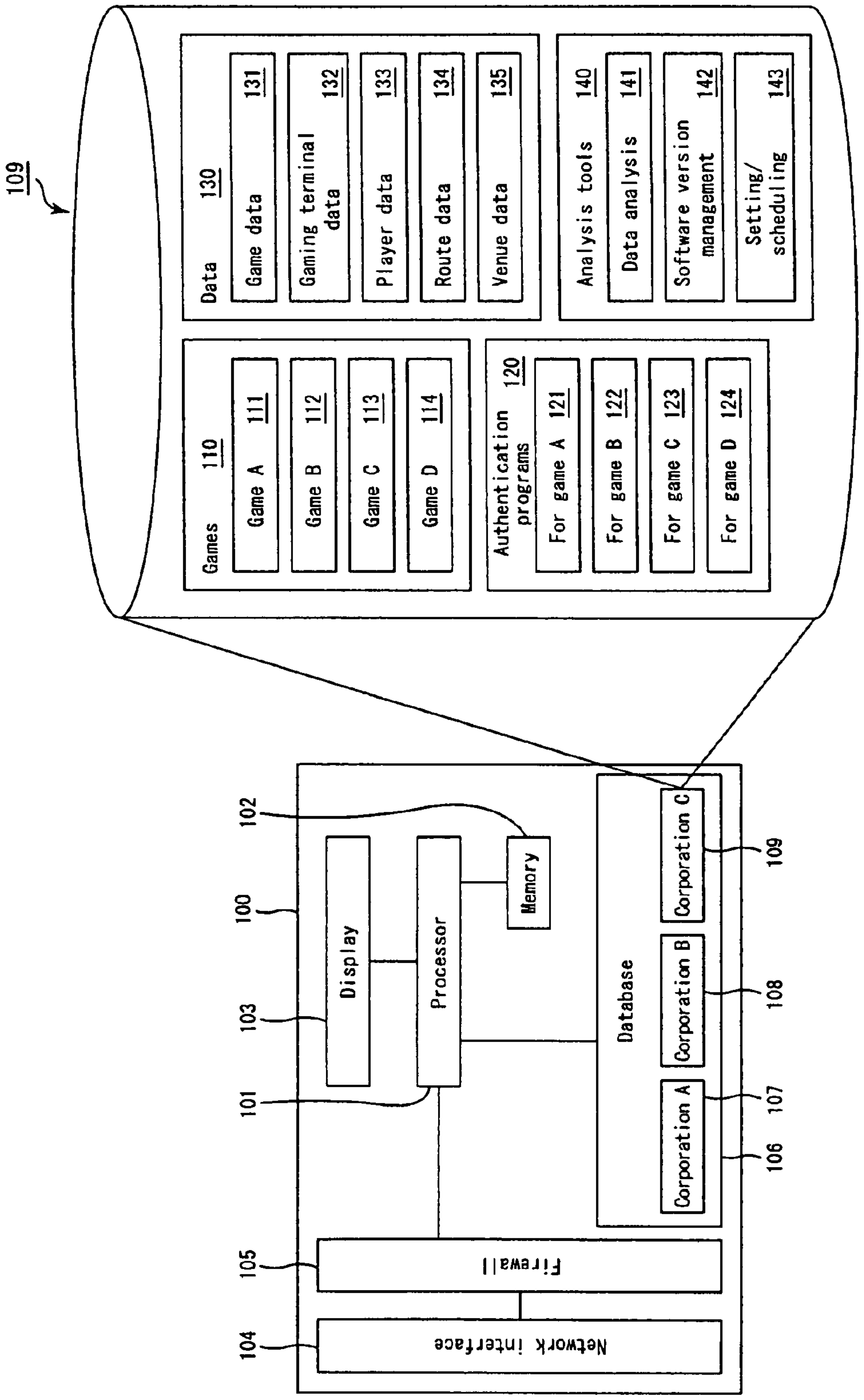
FIG. 2 is a block diagram illustrating the internal structure of a server according to an embodiment of the present invention.

FIG. 2 is a block diagram illustrating the internal structure of a server according to an embodiment of the present invention.

The server 100 includes a processor 101. A memory 102, a database 106 and a display 103 are connected to the processor 101. A network interface 104 is connected to the processor 101 through a firewall 105. The server 100 can communicate with the slot machines (gaming terminals) 10 and the remote terminal 200 through the network interface 104.

The processor 101 corresponds to the processor according to the present invention. The database 106 corresponds to the first memory according to the present invention. The network interface 104 corresponds to the first network interface according to the present invention.

The network interface 104 may be either a wired network interface or a wireless network interface or may include both of them. The server 100 includes a firewall 105 and intercepts, with the firewall 105, unauthorized accesses to the data within the server 100.

The database 106 is a hard disk drive. The database 106 stores, for example, game information such as game process information, game software components, game-software-component information and the like. In the present embodiment, the data in the database 106 is divided for respective entities, as exemplified as "Corporation A" 107, "Corporation B" 108 and "Corporation C" 109.

In the present invention, the number of divisions is not particularly limited, but may be changed as required. Further, the database 106 may be, for example, a well-known recording medium such as a hard disk drive, a CD-RW drive and the like or may be a combination of them.

The data for the respective entities in the database 106 will be described by exemplifying the data of "Corporation C" 109. As illustrated in FIG. 2, the data of "Corporation C" 109 includes games 110, authentication programs 120, data 130 and analysis tools 140.

The games 110 include game software of a game A 111, a game B 112, a game C 113 and a game D 114. Each of the game software is comprised of game system components, a payout table, a game bonusing program, a game progressive program, graphic data, sound data, game jurisdiction information, game network components and the like.

The game system components in the game software to be used in the slot machines 10 include, for example, a symbol selection program. The aforementioned symbol selection program is a program for determining symbols to be rearranged in a symbol matrix (see FIG. 3). The aforementioned symbol selection program includes symbol weighting data associated with respective plurality of types of payout ratios (for example, 80%, 84%, 88%). The symbol weighting data is data which designates the correspondence between respective symbols and one or more random numbers which fall within a predetermined numerical range (0 to 255). The payout ratios are defined on the basis of game jurisdiction information, and symbols to be rearranged in the symbol matrix are determined on the basis of the symbol weighting data associated with the payout ratios.

In the present invention, game software components refer to components which constitute game software. The game software can be structured such that its game software components can be replaced with components of other game software or may be structured such that its game software components can not be replaced.

The authentication programs 120 include a program 121 for the game A, a program 122 for the game B, a program 123 for the game C and a program 124 for the game D. The authentication program is created for the respective game software components. The authentication program includes hash values created from valid game software components and a program for creating hash values from game software components to be authorized using a hash function. The hash function is not particularly limited, but may be, for example, SHA (SHA-1, SHA-256, SHA-384, SHA-512), MD5 and the like. Further, while, in the present embodiment, there will be described a case of employing an authentication program for determining whether or not there is a falsification using a hash function, the authentication program is not particularly limited, and may be a well-known authentication program, in the present invention.

The data 130 includes game data 131, gaming terminal data 132, player data 133, route data 134 and venue data 135.

The game data 131 includes, for example, the number of inserted coins, the number of coins to be paid out, the number of BETs per single game and the like. The gaming terminal data 132 includes, for example, data of game histories of the respective slot machines 10. This data is stored in association with the ID codes of the respective slot machines 10. The player data 133 includes, for example, data of game histories of respective players. This data is stored in association with the ID codes of the respective players. The route data 134 includes, for example, information about gaming terminals which belong to groups of gaming terminals existing in a route constituted by a plurality of venues. The venue data 135 includes, for example, information about gaming terminals which belong to the respective venues.

The analysis tools 140 include applications for data analysis 141 for defining categories in the data 130 and the relationship among the categories, software version management 142 for managing the versions of game software components in the respective gaming terminals and the versions of game software components to be downloaded thereto, and setting/scheduling 143 for setting the respective slot machines 10 in response to updating triggers. The processor 101 can execute these applications to conduct management and analysis of the data 109 of the entity "Corporation C".

Figure 3:
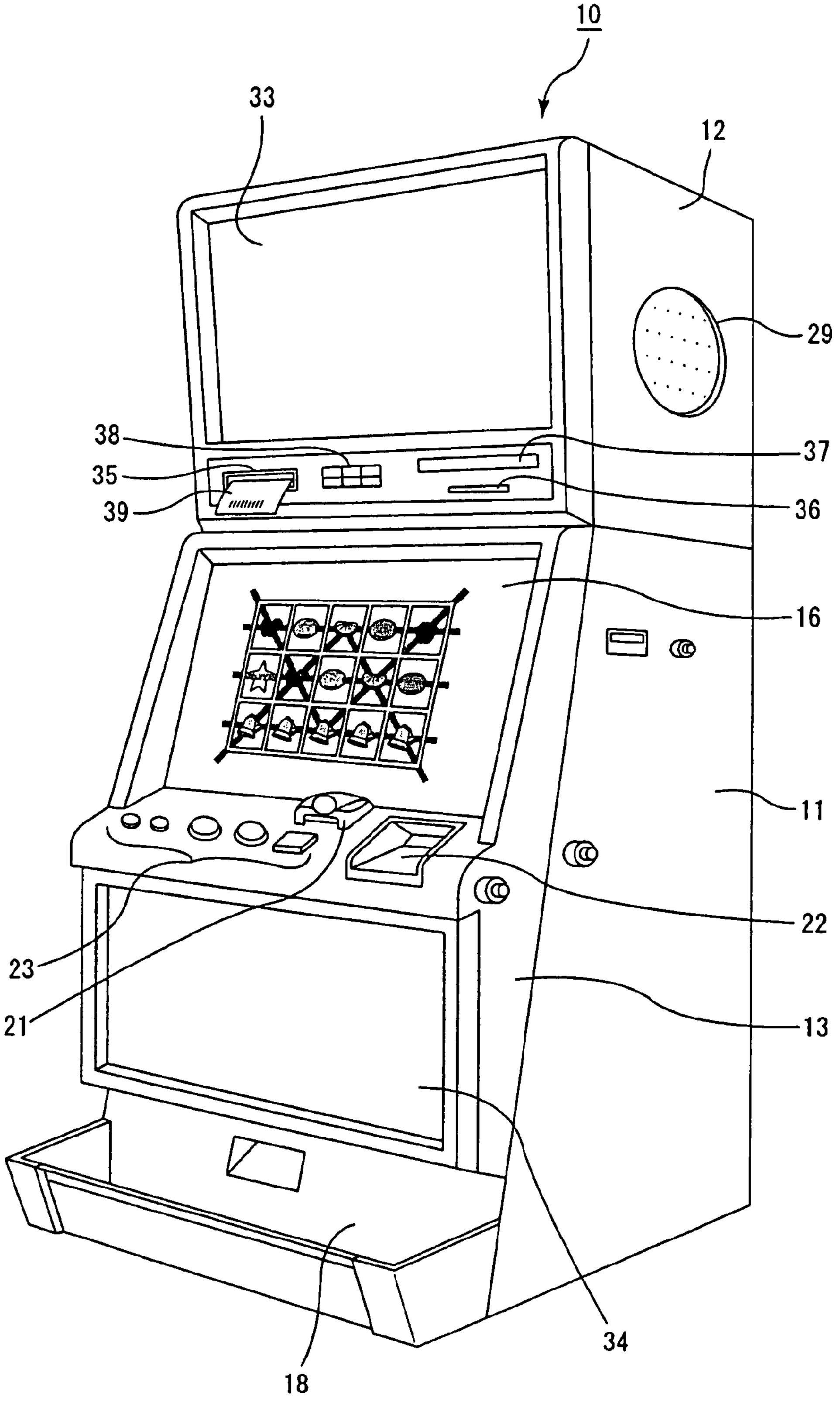
FIG. 3 is a perspective view schematically illustrating a slot machine (a gaming terminal) according to an embodiment of the present invention.

FIG. 3 is a perspective view schematically illustrating a slot machine according to an embodiment of the present invention.

The slot machine 10 includes a cabinet 11, a top box 12 installed at the upper portion of the cabinet 11 and a main door 13 provided in the front surface of the cabinet 11. A lower display 16 is provided in the front side of the main door 13. The lower display 16 includes a liquid crystal display panel which displays a symbol matrix constituted by a total of 15 symbols along 5 columns and 3 rows.

Although not illustrated, a touch panel 69 is provided in the front surface of the lower display 16, and the player can operate the touch panel 69 to input various types of commands. Further, under the lower display 16, there are provided various types of input buttons 23 which enables the player to input various types of commands relating to the progress of games, a coin acceptor 21 which receives coins, and a bill validator 22 which determines whether or not bills are valid and receives valid bills. Also, the bill validator 22 can be configured to be capable of reading a ticket 39 with a bar code. In the lower front surface of the main door 13, a belly glass 34 on which characters and the like of the slot machine 10 are drawn is provided.

An upper display 33 is provided in the front surface of the top box 12. The upper display 33 includes a liquid crystal display panel which displays a payout table and the like. Coin tray is shown by reference numeral 18.

Further, a speaker 29 is provided in the top box 12. Under the upper display 33, a ticket printer 35, a card reader 36, a data display 37 and a key pad 38 are provided. The ticket printer 35 prints, on a ticket, a bar code as coded data of the number of credits, the time and date, the identification number of the slot machine 10 and the like, and outputs the ticket as a ticket 39 with a bar code. It is possible for the player to make another slot machine to read the ticket 39 with a bar code and play a game on the slot machine, or exchange the ticket 39 with a bar code for bills and the like at a predetermined place in a game facility (e.g. a cashier in a casino).

The card reader 36 serves to read data from a smart card and write data into the smart card. The smart card is a card owned by the player and stores, for example, data for identifying the player, data of the history of games played by the player. The smart card can store data corresponding to coins, bills or a credit. Also, instead of such a smart card, it is possible to employ a magnetic stripe card. The data display 37 is comprised of a fluorescent display or the like and displays, for example, data read by the card reader 36 and data inputted by the player through the key pad 38. The key pad 38 is for inputting commands and data relating to ticket issue and the like.

Figure 4:
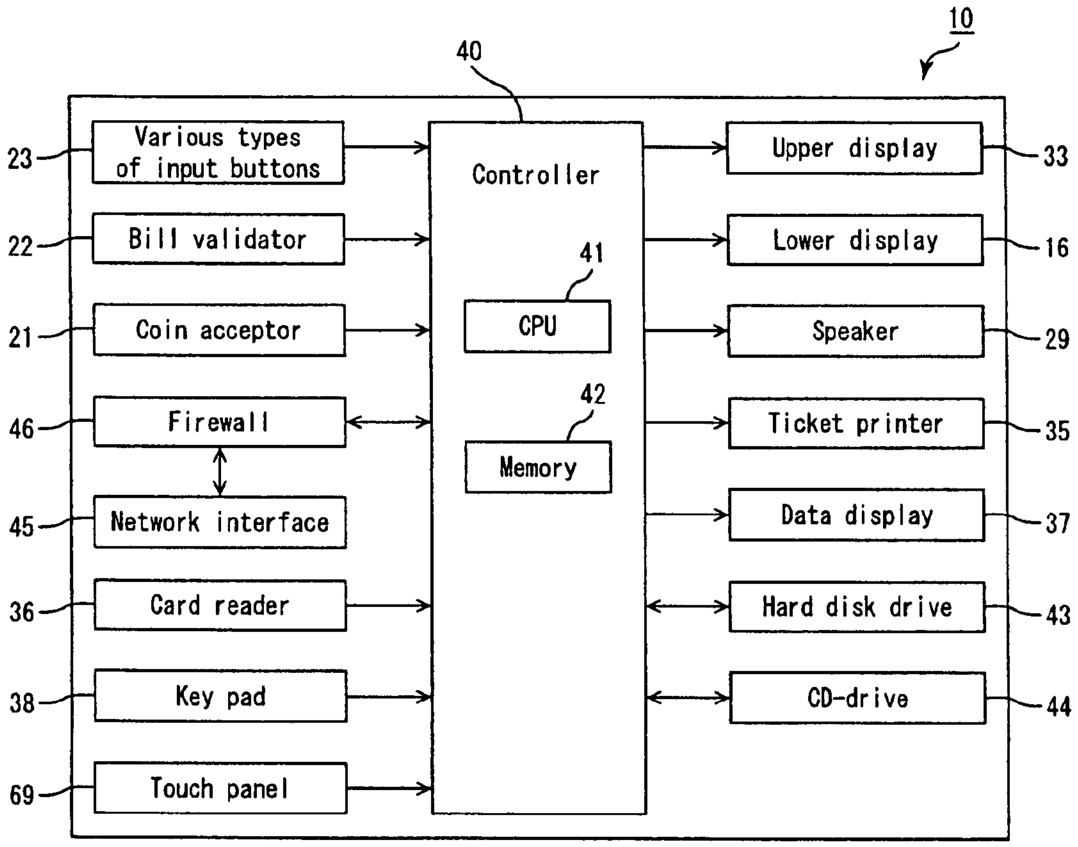
FIG. 4 is a block diagram illustrating the internal structure of the slot machine illustrated in FIG. 3.

FIG. 4 is a block diagram illustrating the internal structure of the slot machine illustrated in FIG. 3.

The slot machine 10 is provided with a controller 40 including a CPU 41 and a memory 42. The various types of input buttons 23, the bill validator 22 and the coin acceptor 21 are connected to the controller 40. Further, the network interface 45 is connected to the controller 40, through the firewall 46. Further, the card reader 36, the key pad 38 and the touch panel 69 are connected to the controller 40.

Further, the upper display 33, the lower display 16, the speaker 29, the ticket printer 35, the data display 37, the hard disk drive 43 and the CD-drive 44 are connected to the controller 40. Game software components downloaded from the server 100 are stored in the hard disk drive 43 and the like. The controller 40 executes, for example, various types of programs included in the game software components stored in the hard disk drive 43 and the like to conduct processing for displaying images to the upper display 33 and the lower display 16, processing for outputting sounds from the speaker 29, and the like.

The network interface 45 corresponds to the second network interface according to the present invention. The hard disk drive 43 corresponds to the second memory according to the present invention. The controller 40 corresponds to the controller according to the present invention.

Figure 5:
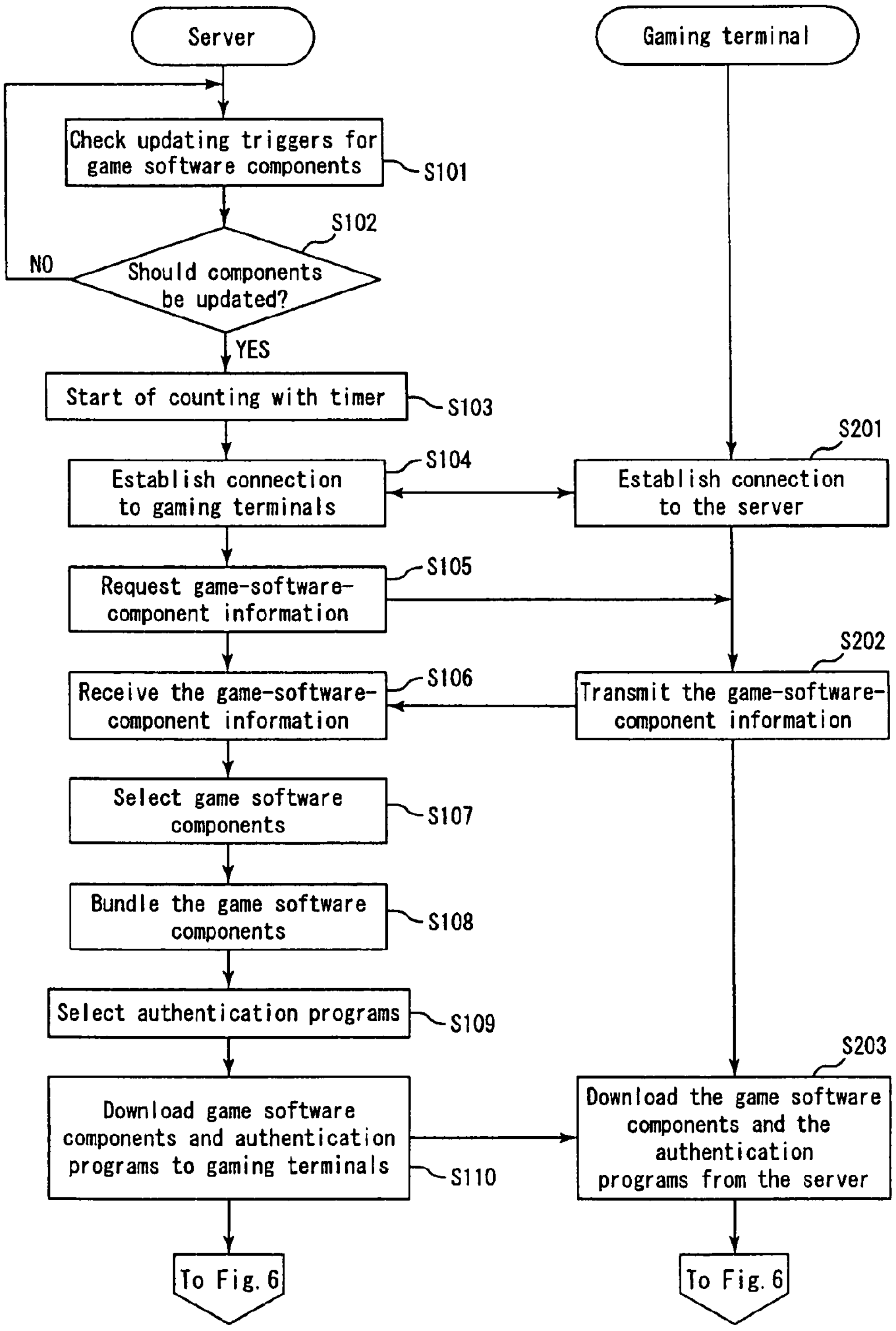
FIG. 5 is a flow chart illustrating processing which is conducted by a server and a slot machine according to an embodiment of the present invention.
Figure 6:
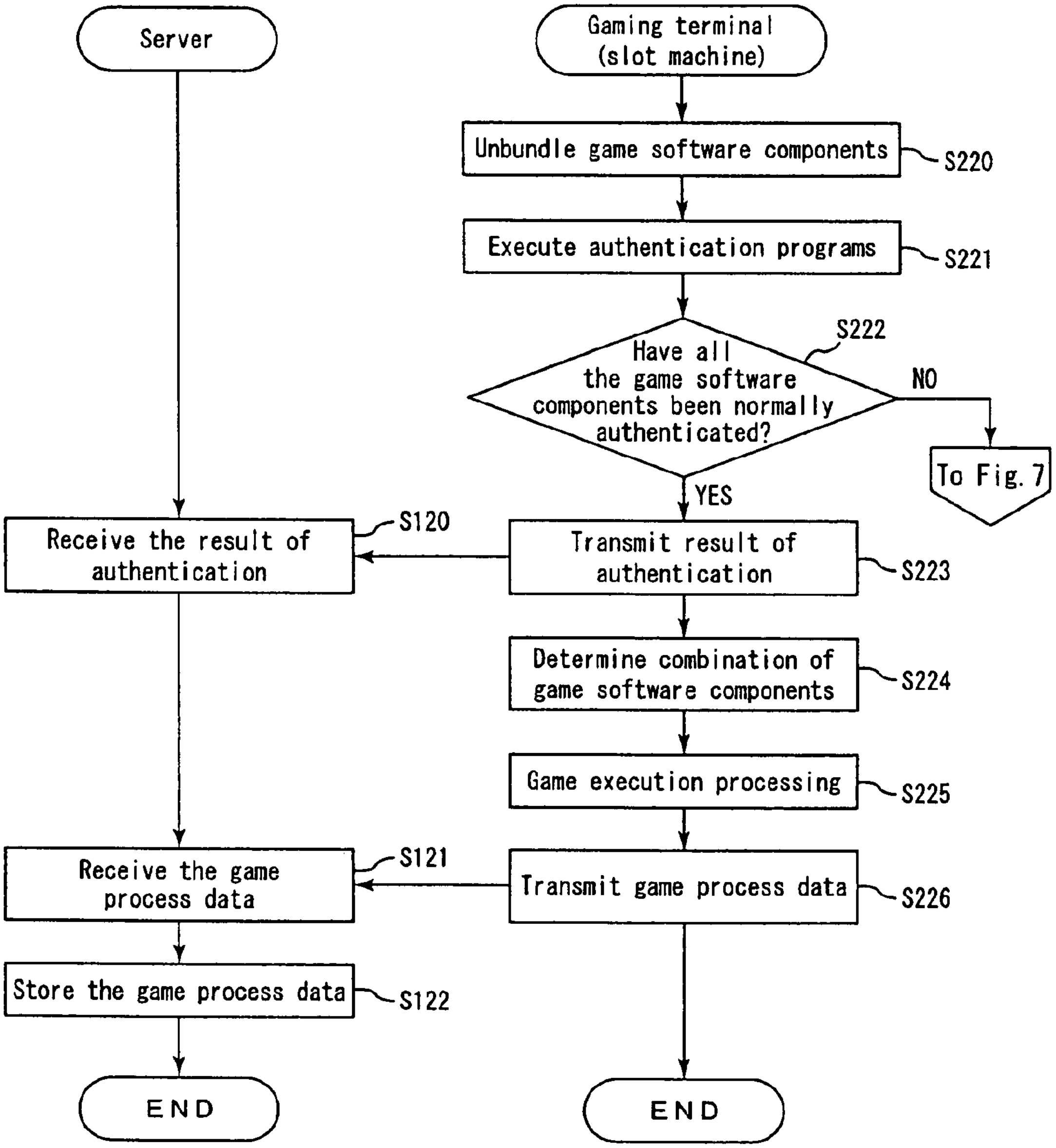
FIG. 6 is a flow chart illustrating processing which is conducted by a server and a slot machine according to an embodiment of the present invention.

FIG. 5 and FIG. 6 are flow charts illustrating processing which is conducted by the server and a slot machine according to an embodiment of the present invention.

First, the processor 101 included in the server 100 checks updating triggers set in each slot machine 10 (gaming terminal) (step S101). A plurality of updating triggers can be set in each slot machine 10. For example, a time, day and week of updating, game events, results of games, game histories, inputs by the player and the like can be set as the aforementioned updating triggers. Also, a combination of a plurality of updating triggers can be employed, in such a way that the payout table is updated in the event of a game event during a certain time period in a certain day.

Next, the processor 101 determines whether or not game software components should be updated, on the basis of the result of the step S101 (step S102). If the processor 101 determines that game software components should not be updated, the processing is returned to the step S101. On the other hand, if the processor 101 determines that game software components should be updated, the processor 101 starts counting with a timer, using the memory 102 (step S103).

Next, the processor 101 conducts processing for establishing connection to the slot machines 10 for which software components should be updated (step S104). At this time, the controller 40 in each slot machine 10 (gaming terminal) conducts processing for establishing connection to the server 100 (step S201).

Next, the processor 101 makes a request of each slot machine 10 for game-software-component information (step S105).

On receiving the request for game-software-component information from the server 100, the controller 40 in each slot machine 10 transmits game-software-component information to the server 100 (step S202). The aforementioned game-software-component information includes, for example, the list of game software components stored in the hard disk drive 43 and the like, version information about game software components.

On receiving the game-software-component information from each slot machine 10, the processor 101 stores it in the database 106 (step S106). Next, the processor 101 selects game software components to be downloaded (step S107).

Next, the processor 101 reads the selected game software components from the database 106 and bundles them in such a way that they can be downloaded to the slot machine 10 (step S108). The processing at the step S108 includes, for example, processing for coding the game software components, processing for compressing the game software components, processing for dividing the game software components into a plurality of packets, and the like.

Next, the processor 101 selects authentication programs which correspond to the game software components selected at the step S107 (step S109). At the step S109, the processor 101 further bundles the selected authentication programs. Also, the processing at the step S109 can be conducted along with the step S108. Namely, the selected game software components and the selected authentication programs can be bundled, after the selection of the authentication programs.

Next, the processor 101 downloads the game software components and the authentication programs to the slot machine 10 (step S110). At this time, each controller 40 downloads the game software components and the authentication programs from the server 100 (step S203).

The controller 40 unbundles the downloaded game software components (step S220). The processing at the step 220 includes, for example, processing for decoding the game software components, processing for decompressing the game software components, combining packets, virus checks, and the like. At the step S220, the controller 40 further unbundles the authentication programs.

Next, the controller 40 executes the authentication programs (step S221). At the step S221, the controller 40 executes a hash function for the respective game software components to create hash values and compares them with hash values pre-stored in the authentication programs. Thus, the controller 40 determines whether or not there are falsifications. If there is no falsification, this results in normal authentication. If there is a falsification, this results in the occurrence of an error.

Next, the controller determines whether or not all the game software components have been normally authenticated (step S222). If the controller determines that not all the game software components have been normally authenticated (if an error occurs), processing which will be described in detail later with reference to FIG. 7 will be conducted.

If the controller 40 determines, at the step S222, that all the game software components have been normally authenticated, the controller 40 transmits the result of the authentication to the server 100 (step S223). The result of the authentication includes the list of the game software components which have been normally authenticated, version information about the aforementioned game software components, the ID code of the gaming terminal (the slot machine 10), and the like.

At this time, the processor 101 receives the result of the authentication (step S120). Hereinafter, there will be described a case where the result of the authentication is received within a predetermined time period since the start of counting with a timer.

Although there is not illustrated, if the result of the authentication is not received within the predetermined time period since the start of counting with the timer, the processor 101 transmits the ID code of the gaming terminal (the slot machine 10) to the portable terminal (remote terminal) 200. This enables a clerk in the casino 2 to immediately notice the existence of a malfunction, such as a falsification, in the game software components or the authentication programs in the gaming terminal (the slot machine 10) specified by the ID code.

If the result of the authentication is transmitted to the server 100 from the slot machine 10 (the gaming terminal) within the predetermined time period since the start of counting with the timer, the controller 40 determines a new combination of game software components, using the downloaded game software components, after the processing at the step S223 (step S224). At this time, the new combination of game software components can be determined, using only the downloaded game software components. Also, the new combination of game software components can be determined, using both the existing game software components and the downloaded game software components.

Next, the controller 40 conducts game execution processing, using the combination of game software components determined at the step S224 (step S225). In the present embodiment, the game execution processing is processing for executing games to be played in the slot machine. In the present invention, the game execution processing is processing corresponding to games to be played in the gaming terminal.

Next, the controller 40 transmits game process data to the server 100 (step S226). On the other hand, the processor 101 receives the game process data from the slot machine 10 (step S121). Thereafter, the processor 101 stores the game process data in the database 106 (step S122) and terminates the present processing.

Figure 7:
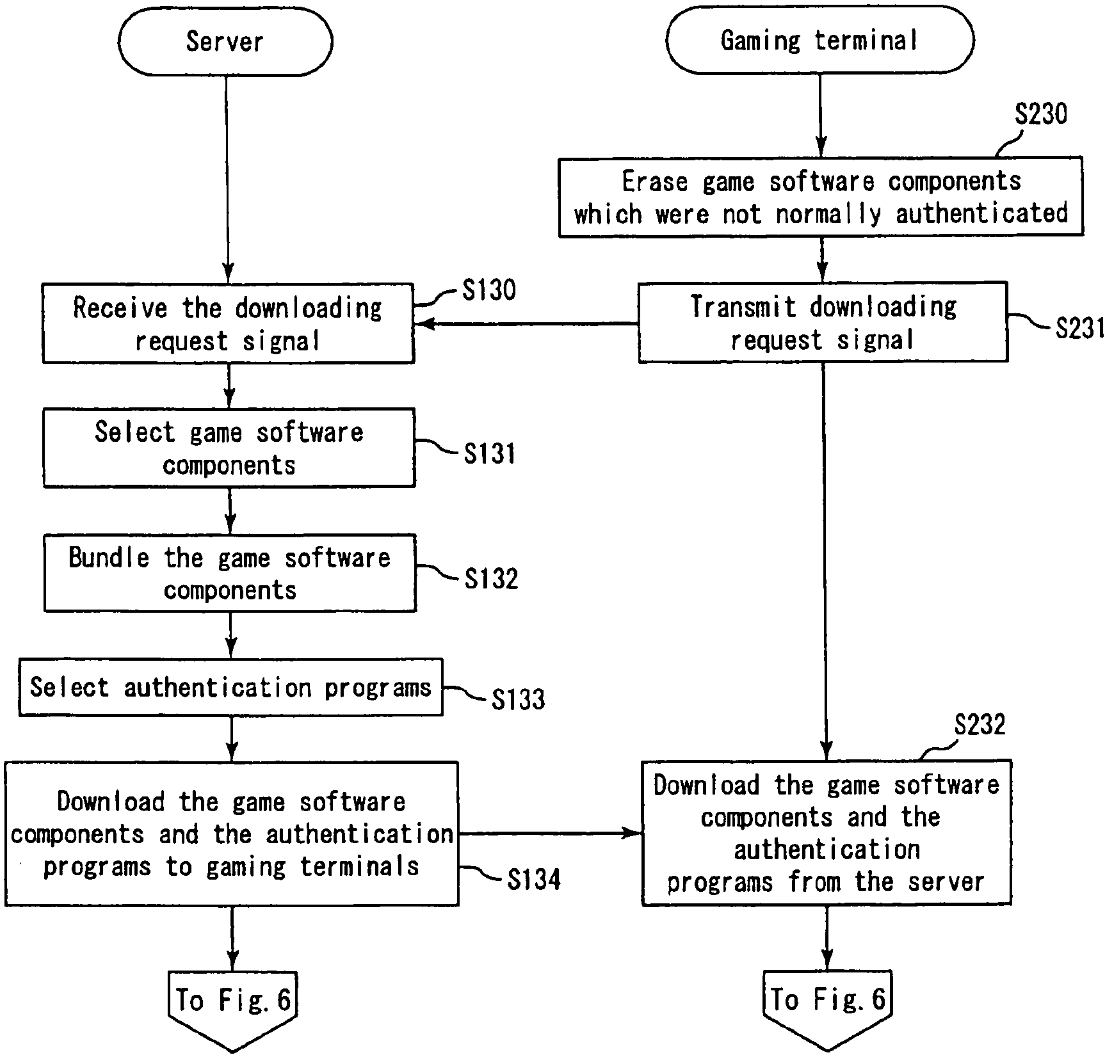
FIG. 7 is a flow chart illustrating processing which is conducted by a server and a slot machine according to an embodiment of the present invention.

Next, with reference to FIG. 7, there will be described a case where it is determined at the step S222 in FIG. 6 that not all the game software components have been normally authenticated.

First, the controller 40 erases the game software components which were not normally authenticated, from the hard disk drive 43 and the like (step S230). Next, the controller 40 transmits a downloading request signal to the server 100 (step S231). The aforementioned request signal includes data which specifies the erased game software components. At this time, the processor 101 receives the aforementioned request signal from the slot machine 10 (step S130).

Thereafter, the processor 101 selects the game software components specified by the data included in the aforementioned request signal (step S131), then bundles the game software components (step S132) and selects authentication programs corresponding to the game software components (step S133). Then, the processor 101 downloads the game software components and the authentication programs to the slot machine 10 (step S134). On the other hand, the controller 40 downloads the game software components and the authentication programs from the server 100 (step S232).

The processing at the steps S131 to S134 and S203 is processing similar to the processing at the steps S107 to S110 and S232 which have been already described and, therefore, description thereof is omitted herein. After the processing at the steps S134 and S232, the processing illustrated in FIG. 6 is conducted.

As described above, the gaming system 1 according to the present embodiment includes the server 100, the plurality of slot machines 10 (gaming terminals), and the network (see FIG. 1).

The server 100 includes the network interface 104 (the first network interface), the database 106 (the first memory), and the processor 101 (see FIG. 2). The database 106 stores games 110 (game software components) and the authentication programs 120. The processor 101 downloads game software components to the slot machine 10, along with authentication programs (the step S110 in FIG. 5).

The slot machines 10 include the network interface 45 (the second network interface), the hard disk drive 43 (the second memory) and the controller 40 (see FIG. 4). The hard disk drive 43 stores the game software components and the authentication programs downloaded from the server 100. Prior to the start of games, the controller 40 executes the authentication programs to authenticate the game software components downloaded from the server 100 (the step S221 in FIG. 6). Further, the controller 40 produces games, using the game software components authenticated through the authentication programs (the step S225 in FIG. 6).

Figure 8:
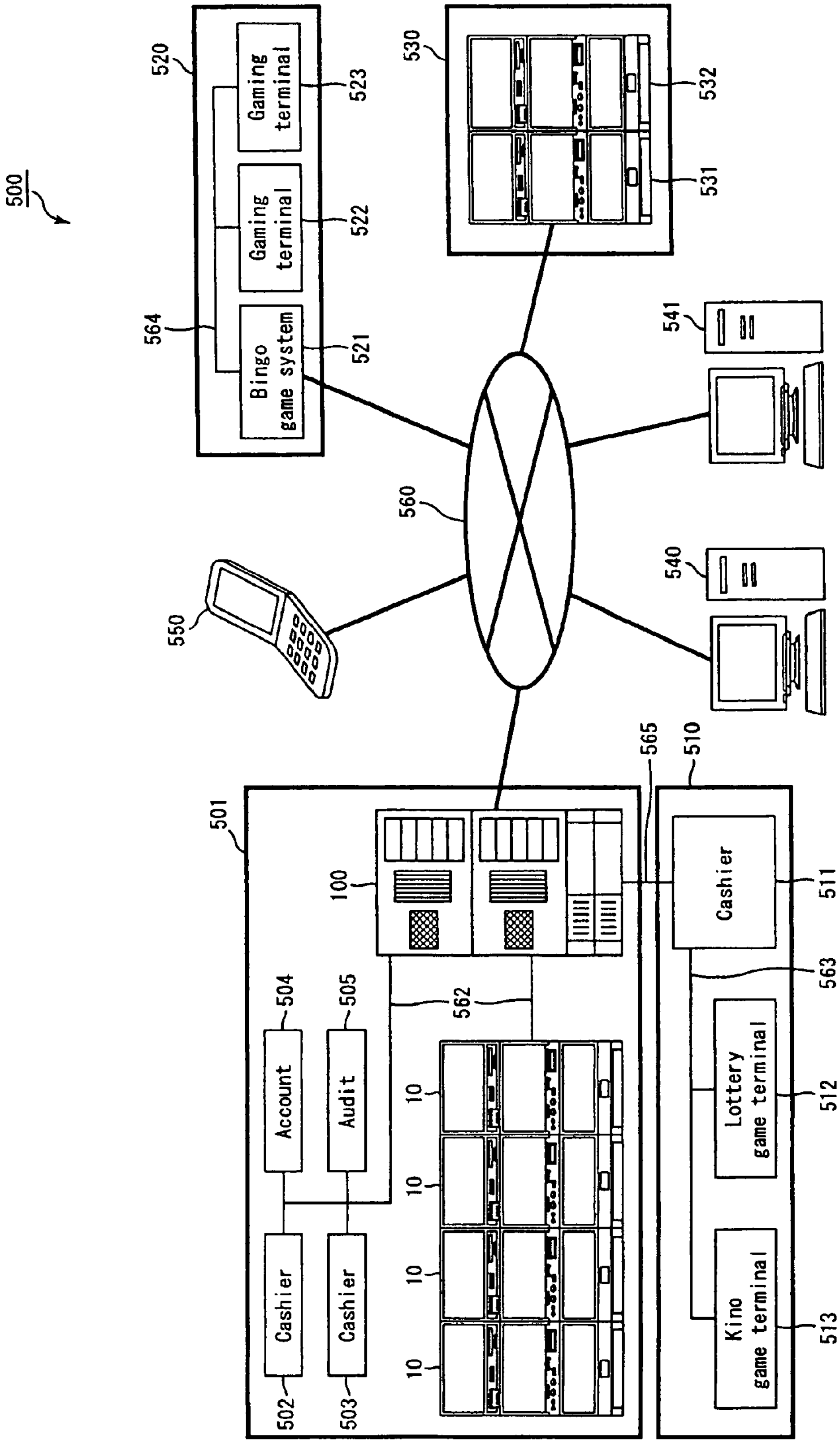
FIG. 8 is a network schematic diagram of a gaming system according to another embodiment of the present invention.

FIG. 8 is a network schematic diagram of a gaming system according to another embodiment of the present invention.

The gaming system 500 includes a server 100. Further, the gaming system 500 includes, as gaming terminals, slot machines 10, a lottery game terminal 512, a Kino game terminal 513, a bingo game system 521, gaming systems 522 and 523, video poker game machines 531 and 532, personal computers 540 and 541 and a portable phone 550.

The server 100 is installed in a casino 501. The plurality of slot machines 10, cashiers 502 and 503, an account 504 and an audit 505 are connected to the server 100 through a LAN 562.

Further, the server 100 is connected to a cashier 511 installed in a restaurant 510, through a secure private intranet 565. Further, the cashier 511 is connected to the lottery game terminal 512 and the Kino game terminal 513, through the LAN 563.

As described above, in the present invention, the server and the gaming terminals can be connected to each other through an intranet. Further, another device (a cashier 511) may be interposed between the server and the gaming terminals.

Further, the server 100 is connected to the bingo game system 521 installed in another casino 520, through the internet 560. The bingo game system 521 is connected to gaming terminals 522 and 523 for executing bingo games, through a LAN 564. Further, the server 100 is connected to the plurality of video poker game machines 531 and 532 installed in a commercial facility 530, through the internet 560. Further, the server 100 is connected to the personal computers 540 and 541 and the portable phone 550, through the internet 560. As described above, in the present invention, the server and the gaming terminals can be connected to each other through the internet. Also, the gaming terminals may be personally-owned devices, such as the personal computers 540, 541 and the portable phone 550.

Although the present invention has been described with reference to embodiments thereof, these embodiments merely illustrate concrete examples, not restrict the present invention. The concrete structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there have been described processes to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processes described in the present specification are to be executed by various types of devices, in principle. Further, other structures required for conducting each step will be apparent from the aforementioned description.

What is claimed as new and desired to be secured by Letters Patent of the United States is:

1. A gaming system comprising:

a server;

a plurality of gaming terminals; and a network which enables communication between said server and said plurality of gaming terminals, said server comprising (A) a first network interface for communicating with said plurality of gaming terminals, (B) a first memory which stores (a) game software components to be used in said plurality of gaming terminals and (b) authentication programs for authenticating said game software components and created for the respective game software components, and (C) a processor designed or configured to select a group of game software components and a group of authentication programs, each authentication program in the group of authentication programs corresponding to a game software component in the group of game software components, the processor further configured to download the group of game software components and the group of authentication programs to said plurality of gaming terminals, and said plurality of gaming terminals each comprising (I) a second network interface for communicating with said server, (II) a controller designed or configured to (i) execute each authentication programs in the group of authentication programs to authenticate the corresponding game software component in the group of game software components downloaded from said server prior to start of a game, (ii) produce a game to be executed at said gaming terminals using the group of game software components authenticated through the group of authentication programs, and (iii) automatically erase a game software component in the group of game software components, in the event of occurrence of an error as a result of the authentication of the game software component through a corresponding authentication program in the group of authentication programs, (iv) transmit, to said server, a request signal for requesting downloading of the game software component and the corresponding authentication program to this gaming terminal, in the event of occurrence of an error as a result of the authentication of the game software component through the corresponding authentication program, and (III) a second memory which stores the group of game software components and the group of authentication programs downloaded from said server.

2. The gaming system according to claim 1, wherein said processor is designed or configured to download the game software component and the corresponding authentication program to this gaming terminal, on receiving the request signal from said controller.

3. The gaming system according to claim 1, wherein said controller is designed or configured to execute the group of authentication programs at predetermined regular time intervals, in addition to the time prior to start of a game, to authenticate the group of game software components downloaded from said server.

4. The gaming system according to claim 1, wherein said controller is designed or configured to transmit, to said server, the result of authentication of the group of game software components through the group of authentication programs, along with an ID code assigned to this gaming terminal.

5. The gaming system according to claim 4, further comprising a remote terminal capable of communicating with said server, said processor designed or configured to transmit an error notification signal to said remote terminal when said processor does not receive the result of authentication from said gaming terminal within a predetermined time period, and said error notification signal includes the ID code assigned to the corresponding gaming terminal.

6. The gaming system of claim 5, wherein the remote terminal is portable terminal capable of wireless communication.

7. The gaming system according to claim 1, wherein the game software components are configured to be replaceable with other game software components.

8. A server capable of communicating with a plurality of gaming terminals comprising:

(A) a network interface for communicating with the plurality of gaming terminals;

(B) a memory which stores (a) game software components to be used in said plurality of gaming terminals and (b) authentication programs for authenticating said game software components and created for the respective game software components; and (C) a processor designed or configured to select a group of game software components and a group of authentication programs, each authentication program in the group of authentication programs corresponding to a game software component in the group of game software components, the processor further configured to download the group of game software components and the group of authentication programs to said plurality of gaming terminals, wherein said processor is designed or configured to download a game software component in the group of game software components and a corresponding authentication program in the group of authentication programs to a gaming terminal, on receiving a request signal for requesting downloading of the game software component and the corresponding authentication program to the gaming terminal which is transmitted from the gaming terminal, in the event of occurrence of an error as a result of the authentication of the game software component through the corresponding authentication program in said gaming terminal.

9. The server according to claim 8, wherein said plurality of gaming terminals comprise a remote terminal capable of communicating with said server, and said processor is designed or configured to transmit an error notification signal to one of said remote terminals of said plurality of gaming machines when said processor does not receive the result of authentication from said gaming terminals within a predetermined time period, and said error notification signal includes an ID code assigned to the corresponding gaming terminals.

10. The server of claim 9, wherein the remote terminal is portable terminal capable of wireless communication.

11. The server according to claim 8, wherein the game software components are configured to be replaceable with other game software components.

12. A gaming terminal comprising:

(I) a network interface for communicating with a server capable of communicating with a plurality of gaming terminals;

(II) a controller designed or configured to (i) execute a group of authentication programs downloaded from a server to authenticate a group of game software components downloaded from said server, prior to start of a game, each authentication program in the group of authentication programs corresponding to a game software component in the group of game software components to be authenticated and created based on the group of game software components to be authenticated, (ii) produce games to be executed using the group of game software components authenticated through the group of authentication programs, (iii) automatically erase a game software component in the group of game software components, in the event of occurrence of an error as a result of the authentication of the game software component through a corresponding authentication program in the group of authentication programs, and (iv) transmit, to said server, a request signal for requesting downloading of the game software component and the authentication program, in the event of occurrence of an error as a result of the authentication of the game software component through the authentication program; and (III) a memory which stores the group of game software components and the authentication programs downloaded from said server.

13. The gaming terminal according to claim 12, wherein said controller is designed or configured to execute the group of authentication programs at predetermined regular time intervals, in addition to the time prior to start of a game, to authenticate the group of game software components downloaded from said server.

14. The gaming terminal according to claim 12, wherein said controller is designed or configured to transmit, to said server, the result of authentication of the group of game software components through the group of authentication program, along with an ID code.

15. The gaming terminal according to claim 12, wherein the group of game software components is configured to be replaceable with another group of game software components.

16. A game control method comprising:

downloading by a server a group of game software components and a group of authentication programs for authenticating the group of game software components to a gaming terminal, each authentication program in the group of authentication programs created for and corresponding to a game software component of the group of game software components;

executing by a gaming terminal the group of authentication programs to authenticate the group of game software components downloaded from said server, prior to start of a game;

producing by said gaming terminal a game to be executed in said gaming terminal using the group of game software components authenticated through the group of authentication programs;

automatically erasing by said gaming terminal a game software component in the group of game software components, in the event of occurrence of an error as a result of the authentication of the game software component through a corresponding authentication program in the group of authentication programs; and transmitting by said gaming terminal, to said server, a request signal for requesting downloading of the game software component and the corresponding authentication program, in the event of occurrence of an error as a result of the authentication of the game software component through the corresponding authentication program.

17. The game control method according to claim 16, wherein the executing by said gaming terminal the group of authentication programs is conducted at predetermined regular time intervals, in addition to the time prior to start of a game, to authenticate the group of game software components downloaded from said server.

18. The game control method according to claim 16, wherein the group of game software components is configured to be replaceable with another group of game software component.

19. The game control method according to claim 16, further comprising downloading by said server the game software component and the corresponding authentication program to said gaming terminal, on receiving said request signal from said gaming terminal.

* * * * *